350-393 SR
XR 3,423,595
CROSS REFERENCE SEARCH ROOM
TX 4026T WP

Jan. 21, 1969 J. J. HICKEY 3,423,595

HIGH SPEED MODULATOR FOR ELECTRONIC SHUTTER

Filed Aug. 30, 1965 Sheet 1 of 2

John J. Hickey,
INVENTOR.
BY.
Jerry A. Dinardo
AGENT.

3423595

John J. Hickey,
INVENTOR.
BY.
Jerry G. Dinardo
AGENT.

United States Patent Office 3,423,595

Patented Jan. 21, 1969

3,423,595

HIGH SPEED MODULATOR FOR ELECTRONIC SHUTTER

John J. Hickey, Hawthorne, Calif., assignor to TRW Inc., Redondo Beach, Calif., a corporation of Ohio Filed Aug. 30, 1965, Ser. No. 483,684

U.S. Cl. 250—213 6 Claims

Int. Cl. H01j *39/12; 31/50*

ABSTRACT OF THE DISCLOSURE

A shutter pulse for an electronic shutter that is twice the supply voltage is generated by sequentially discharging delay lines connected to each side of the electronic shutter.

Figure 1:
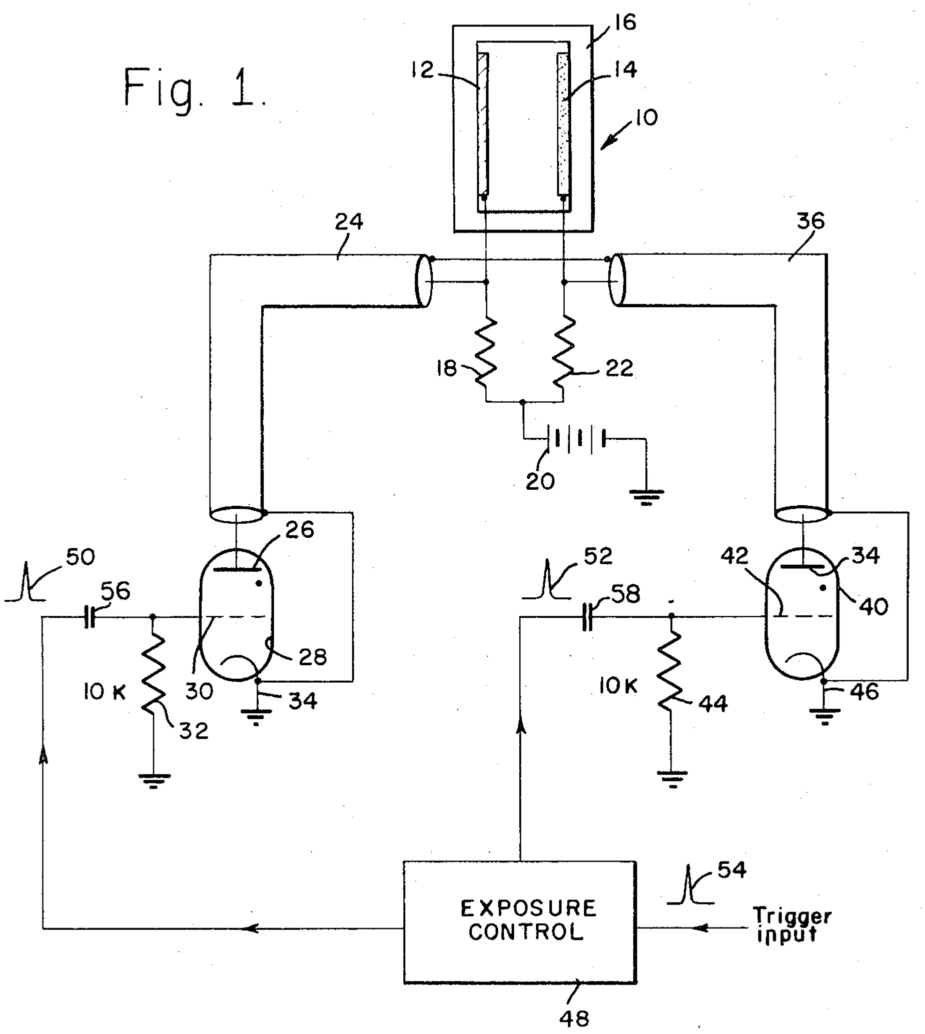

Electronic shutters of the image converter and Kerr cell types, generally require modulating voltages on the order of tens of kilovolts for their operation. It has generally been the practice to use pulse forming networks or cables in conjunction with thyratrons or spark gap switches for pulsing these shutters for microsecond and sub-microsecond times. With this technique, one normally obtains a pulse output equal to one half the supply voltage. In some special types of circuits it is possible to obtain full supply voltage out for one half the normal pulse duration. It is relatively difficult to change the pulse duration because of the high voltages involved.

It is, therefore, an object of this invention to provide a high speed modulating circuit for high impedance, capacitive loads, such as image converters of Kerr cells, which requires lower supply voltages.

Another object is to provide a gating circuit for electronic shutters, wherein continuous control of pulse duration is accomplished at relatively low switching voltages.

The foregoing and other objects are realized, according to one embodiment of the invention, in a circuit which includes means for establishing initial positive potentials on each side of a high impedance load, such as an electronic shutter. The circuit also includes a delay line connected to one side of the load in series with a normally open unidirectional switch, such as a thyratron. The delay time of the delay line is substantially longer than the rise time of the switch. Means are provided for closing the switch to discharge the delay line.

During the discharge of the delay line, a traveling wave or negative step voltage travels down the line. When it reaches the end of the line, it is reflected back in phase, since the electronic shutter presents a high impedance. The combined negative step traveling wave and the in-phase reflected wave causes the potential on one side of the electronic shutter to drop by an amount in excess of the initial potential thereon. Thus, the electronic shutter is opened by receiving a switching voltage in excess of the supply voltage. When the reflected wave reaches the thyratron switch, current through the switch attempts to reverse direction, but is prevented from doing so by the unidirectional characteristics of the thyratron switch. Since the energy stored in the delay line has gone from positive capacitive storage, to inductive storage, to negative capacitive storage, no further reflections occur, and the high difference in potential is maintained across the electronic shutter.

The electronic shutter may be closed by connecting a second delay line and thyratron switch to the opposite side thereof to generate similar traveling and reflected waves which bring the potential of the opposite side of the electronic shutter to that of the first side.

Figure 2:
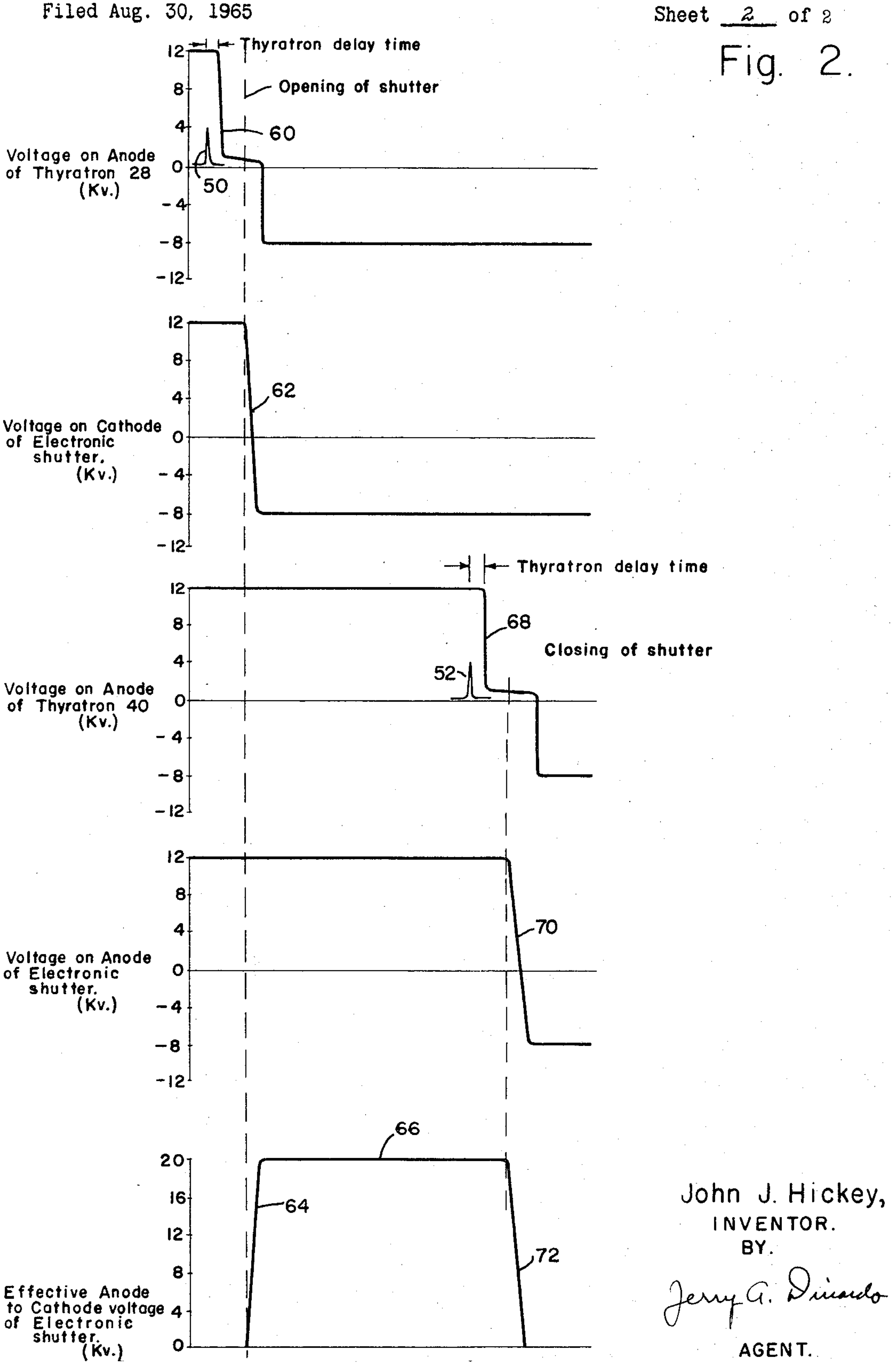

In the drawing:

FIGURE 1 is a circuit diagram of a high speed modulator for an electronic shutter; and FIGURE 2 is a graph of waveforms useful in explaining the operation of the modulator.

Referring to FIGURE 1, there is shown an electronic shutter, such as an image converter tube 10. The image converter tube 10 may be of the type known as a proximity diode comprising a photocathode 12 and fluorescent screen 14 closely spaced within an evacuated envelope 16. When a potential difference is established between the photocathode 12 and fluorescent anode 14, a light image projected on the photocathode 12 will cause electrons to be emitted by the latter, which electrons strike the fluorescent anode 14 and cause the image to be reproduced thereon in amplified form. A transient luminous event may be photographed by applying a voltage pulse across the photocathode 12 and fluorescent anode 14, while the photocathode 12 is exposed to the luminous event, and projecting the reproduced image on a photographic film.

The photocathode 12 is connected through a charging resistor 18 to the positive side of a direct current voltage supply 20. Similarly, the fluorescent anode 14 is connected through a charging resistor 22 to the positive side of the voltage supply 20.

The photocathode 12 is coupled through a delay line 24 to the anode 26 of a unidirectional switch, such as a thyratron tube 28. The grid 30 of the tube 28 is grounded through a grid resistor 32 and the cathode 34 is grounded.

The fluorescent anode 14 is coupled through a delay line 36 to the anode 34 of a second unidirectional switch, such as a thyratron tube 40 similar to the first tube 28. The grid 42 of the second tube 40 is grounded through a grid resistor 44, and the cathode 46 is grounded.

An exposure control unit 48, such as a trigger delay generator, provides two output trigger pulses 50 and 52 in response to an input trigger pulse 54. The second trigger pulse 52 is delayed relative to the first trigger pulse 50. The time delay between the trigger pulses is made variable from about .005 to 10 microseconds, depending upon the time duration desired of the switching pulse to be generated and applied to the image converter tube 10, as will be described. The output trigger pulses 50 and 52 are coupled through capacitors 56 and 58 respectively to the grids 30 and 42 of the thyratron tubes 28 and 40.

The operation of the high speed modulator will now be described. Initially, thyratron tubes 28 and 40 are non-conducting. The delay lines 24 and 36 are initially charged to the voltage of the voltage supply 20, which may be 12 kilovolts, for example. Thus, both anodes 26 and 34 of the thyratron tubes 28 and 40, the photocathode 12, and the fluorescent anode 14 are at a positive potential of 12 kilovolts and no potential difference exists across the image converter tube 10.

An input trigger pulse 54 to the exposure control unit 48 produces a first output trigger pulse 50 which is coupled to the grid 30 of the first thyratron tube 28. Following its normal delay time the thyratron tube 28 turns on within a few nanoseconds to initiate a discharge of the delay line 24. Upon initiation of the discharge, a traveling voltage wave in the form of a negative step 60 travels down the delay line 24 from the anode 26 of thyratron 28 to the photocathode 12 of image converter tube 10. Referring to FIGURE 2, the negative step 60 has an amplitude slightly less than the voltage of the supply 20, due to the voltage drop across the thyratron tube 28, and is typically about 11 kilovolts. When the negative step 60 reaches the photocathode end of the delay line 24, it is reflected back in phase, since the image converter tube represents a relatively high impedance or low capacitance, compared to that of the delay line 24. The reflected wave has an amplitude of about 9 kilovolts. Thus, the addition of the negative step 60 and the reflected wave will cause the potential of the photocathode 12 to drop to about —8 kilovolts, as indicated by the negative step 62. The potential difference between the photocathode 12 and fluorescent anode 14 of the image converter tube is then about 20 kilovolts as indicated by the leading edge 64 of the shutter pulse 66. The shutter pulse 66 allows electrons to flow from the photocathode 12 to the fluorescent anode 14 when the photocathode 12 is exposed to a light image. In other words, the electronic shutter is now open.

When the reflected wave reaches the anode 26 of the thyratron tube 28, the potential of the anode 38 drops to −8 kilovolts, there are no further reflections, and the thyratron tube 28 ceases conduction.

When the second output trigger pulse 52 is applied to the grid 42 of the second thyratron, the second thyratron fires and sends a traveling wave or negative step 68 down the second delay line 36 in the same manner as that described above in connection with the first thyratron tube 28 and delay line 24. When the traveling wave 68 reaches the end of the delay line 36 connected to the fluorescent anode 14, it is reflected in phase, causing the fluorescent anode potential to drop from +12 kilovolts to −8 kilovolts, as shown in waveform 70, which latter potential is substantially the same potential as the photocathode 12. Since there is no significant potential difference between the photocathode 12 and fluorescent anode 14, the electronic shutter, as indicated by the trailing edge 72 of the shutter pulse 66, is now closed. When the reflected wave reaches the anode 38 of the thyratron tube 40, the latter ceases conduction.

After the thyratron tubes 28 and 40 cease conducting, the delay lines 24 and 36 recharge exponentially to their initial 12 kilovolts through their charging resistors 18 and 22 respectively.

It will be noted that the modulating circuit as above described produces a modulating or shuttering voltage that is almost twice the supply voltage, that is, a supply voltage of 12 kilovolts is used to produce a modulating voltage of 20 kilovolts. Stated otherwise, a relatively low voltage is switched to produce a relatively high modulating voltage. Furthermore, the duration of the effective modulating voltage is readily and continuously variable simply by changing the delay time between trigger pulses 50 and 52. It will be observed that the duration of the effective modulating voltage shown in waveform 66, or the exposure time, is substantially equal to the delay between the trigger pulses 50 and 52. This results from the fact that the delay time between the first trigger pulse 50 and the opening of the shutter, which is the sum of the first thyratron tube 28 delay time and the delay time of the first delay line 24, is equal to the delay time between the second trigger pulse 52 and the closing of the shutter, which is the sum of the second thyratron tube 40 delay time and the delay time of the second delay line 36.

In order to provide the high modulating voltages in the above circuit, the energy absorbed by the thyratron must be kept relatively low. To accomplish this, the delay time of the delay lines must be relatively long as compared to the rise time of the thyratron. Also, the impedance of each thyratron when conducting must be low as compared to the impedance of each of the delay lines. In order to maintain the negative charge, such as −8 kilovolts on the first delay line, the first thyratron must not conduct in the reverse direction. Desirably, at the short current pulse durations experienced in this circuit, the unidirectional characteristics of a thyratron are maintained for higher inverse voltages than would normally be expected.

In accordance with one operative embodiment, the following circuit values were used:

Image converter tube 10—RCA developmental No. C33012
Resistor 18—100 megohms Voltage supply 20—12 kilovolts
Resistor 22—100 megohms
Delay line 24—6 feet RG 58 coaxial cable
Thyratron tube 28—Kuthe 7583
Resistor 32—1 kilohm
Delay line 36—6 feet RG 58 coaxial cable
Thyratron tube 40—Kuthe 7583
Resistor 44—1 kilohm
Capacitor 56—.001 microfarad
Capacitor 58—.001 microfarad.

The embodiments of the invention in which an exclusive property or privilege is claimed are defined as follows:

1. In combination with a high impedance load;
a delay line connected to one side of said load in series with a normally open unidirectional switch;
means including said delay line for establishing initial operating potentials on each side of said load;
the delay time of said delay line being substantially longer than the turn on time of said switch;
means for closing said switch to discharge said delay line and develop a step voltage at said one side of said load;
the impedance of said switch when closed being substantially less than that of said delay line.

2. The invention according to claim 1, wherein said switch comprises a thyratron.

3. In combination:
an electronic shutter;
a first delay line connected to one side of said electronic shutter in series with a first normally open switch;
a second delay line connected to the other side of said electronic shutter in series with a second normally open switch;
means including said delay lines for establishing predetermined substantially equal positive operating potentials on each side of said electronic shutter;
and means for closing said first and second switches in sequence thereby to develop an electrostatic shutter pulse across said electronic shutter that is in excess of said predetermined positive potentials.

4. The invention according to claim 3, wherein each of said switches comprises a thyratron.

5. In combination with a proximity diode:
means for supplying a direct current positive potential to each side of said diode;
a first delay line connected to the cathode of said diode in series with a first thyratron;
a second delay line connected to the anode of said diode in series with a second thyratron;
means for applying time spaced switching pulses to said first and second thyratrons in that order to sequentially discharge said delay lines;
thereby to develop an electrostatic shutter pulse across said diode having an amplitude in excess of said direct current positive potential.

6. The invention according to claim 5, wherein the time delay between said switching pulses is selectively variable, thereby to vary the duration of said shutter pulse.

References Cited

UNITED STATES PATENTS

| | | | |
|---|---|---|---|
| 2,438,962 | 4/1948 | Burlingame et al. | 328—67 X |
| 3,041,936 | 7/1962 | Hull | 350—150 |
| 3,214,697 | 10/1965 | Clark | 328—67 |

JAMES W. LAWRENCE, *Primary Examiner.*

R. F. HOSSFELD, *Assistant Examiner.*

U.S. Cl. X.R.

328—67; 350—150